US012147257B2

(12) United States Patent
Hashimoto et al.

(10) Patent No.: US 12,147,257 B2
(45) Date of Patent: Nov. 19, 2024

(54) ELECTRONIC DEVICE WITH VOLTAGE REGULATOR FOR REGULATING ADJUSTABLE LEVEL OF ELECTRONIC ELEMENT

(71) Applicant: Innolux Corporation, Miaoli County (TW)

(72) Inventors: Kazuyuki Hashimoto, Miaoli County (TW); Junya Shibata, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 69 days.

(21) Appl. No.: 17/970,538

(22) Filed: Oct. 20, 2022

(65) Prior Publication Data

US 2024/0134402 A1 Apr. 25, 2024
US 2024/0231402 A9 Jul. 11, 2024

(51) Int. Cl.
*G05F 1/575* (2006.01)
*G05F 1/46* (2006.01)
*G05F 1/67* (2006.01)

(52) U.S. Cl.
CPC .............. *G05F 1/575* (2013.01); *G05F 1/461* (2013.01); *G05F 1/67* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463;
(Continued)

(56) References Cited

U.S. PATENT DOCUMENTS

| | | | | |
|---|---|---|---|---|
| 8,289,009 | B1 * | 10/2012 | Strik | G05F 1/575 323/280 |
| 11,474,551 | B1 * | 10/2022 | Tan | G05F 1/565 |

(Continued)

FOREIGN PATENT DOCUMENTS

| | | | |
|---|---|---|---|
| CN | 101373388 | 2/2009 | |
| CN | 102879919 | 1/2013 | |
| EP | 3017663 B1 * | 3/2021 | H05B 33/0848 |

*Primary Examiner* — Thienvu V Tran
*Assistant Examiner* — Nusrat Quddus
(74) *Attorney, Agent, or Firm* — JCIPRNET

(57) ABSTRACT

An electronic device is provided. The electronic device includes a power generator, a power regulator and an electronic element. The power generator is configured to provide an input voltage. The power regulator includes a voltage regulator. The voltage regulator is electrically connected to the power generator. The voltage regulator is configured to receive the input voltage to generate an output voltage. The electronic element is electrically connected to the power regulator. The electronic element is configured to receive the output voltage. The power regulator generates a control signal according to the input voltage. The power regulator provides the control signal to the electronic element. An adjustable level of the electronic element is adjusted according to the control signal.

19 Claims, 13 Drawing Sheets

(58) Field of Classification Search
CPC ......... G05F 1/46; G05F 1/461; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17
See application file for complete search history.

(56) References Cited

U.S. PATENT DOCUMENTS

2007/0188154 A1* 8/2007 Fan ......................... G05F 1/565 323/273
2009/0015299 A1* 1/2009 Ryu ...................... H03F 1/0211 327/108
2011/0057635 A1* 3/2011 Ishikawa ............... H02M 3/158 323/282
2011/0156674 A1* 6/2011 Lin ......................... G05F 1/575 323/282
2011/0285366 A1* 11/2011 Huang .................. H02M 3/156 323/282
2012/0080950 A1* 4/2012 Liu ........................... G05F 1/67 307/43
2014/0002041 A1* 1/2014 Soenen ................... G05F 1/575 323/273
2014/0145695 A1* 5/2014 Riedel ....................... G06F 1/30 323/281
2015/0061621 A1* 3/2015 Pons ......................... G05F 1/56 323/280
2016/0173066 A1* 6/2016 Yang ................ H03K 19/01714 327/109
2016/0366733 A1* 12/2016 Wang ................. H05B 45/3725
2018/0026531 A1* 1/2018 Nagda ................... H02M 3/156 327/109
2018/0028016 A1* 2/2018 Vetterli ................. A47J 31/007
2018/0053463 A1* 2/2018 Kong ........................ G09G 3/20
2018/0269784 A1* 9/2018 Ueno .................... H02M 3/156
2020/0220451 A1* 7/2020 De Vos ................. H02M 3/156
2022/0350354 A1* 11/2022 D'Souza ................... G05F 1/56
2023/0018036 A1* 1/2023 Saha ....................... G05F 1/573
2024/0231403 A1* 7/2024 Jing .......................... G05F 1/56

* cited by examiner

ELECTRONIC DEVICE WITH VOLTAGE REGULATOR FOR REGULATING ADJUSTABLE LEVEL OF ELECTRONIC ELEMENT

BACKGROUND

Technical Field

The disclosure relates an electronic device, particularly, the disclosure relates to an electronic device including a power regulator.

Description of Related Art

In general, the conventional control system having the energy harvesting source may only perform the simply energy harvesting functions. If the environmental changes occur, the conventional control system has no way of knowing, except for additional sensors, and the related control operations just only be performed in a manual manner.

SUMMARY

The electronic device of the disclosure includes a power generator, a power regulator and an electronic element. The power generator is configured to provide an input voltage. The power regulator includes a voltage regulator. The voltage regulator is electrically connected to the power generator. The voltage regulator is configured to receive the input voltage to generate an output voltage. The electronic element is electrically connected to the power regulator. The electronic element is configured to receive the output voltage. The power regulator generates a control signal according to the input voltage. The power regulator provides the control signal to the electronic element. An adjustable level of the electronic element is adjusted according to the control signal.

Based on the above, according to the electronic device of the disclosure, the electronic element can obtain the output voltage as a power supply source from the power generator, and the adjustable level of the electronic element is automatically adjusted corresponding to the input voltage from the power generator.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
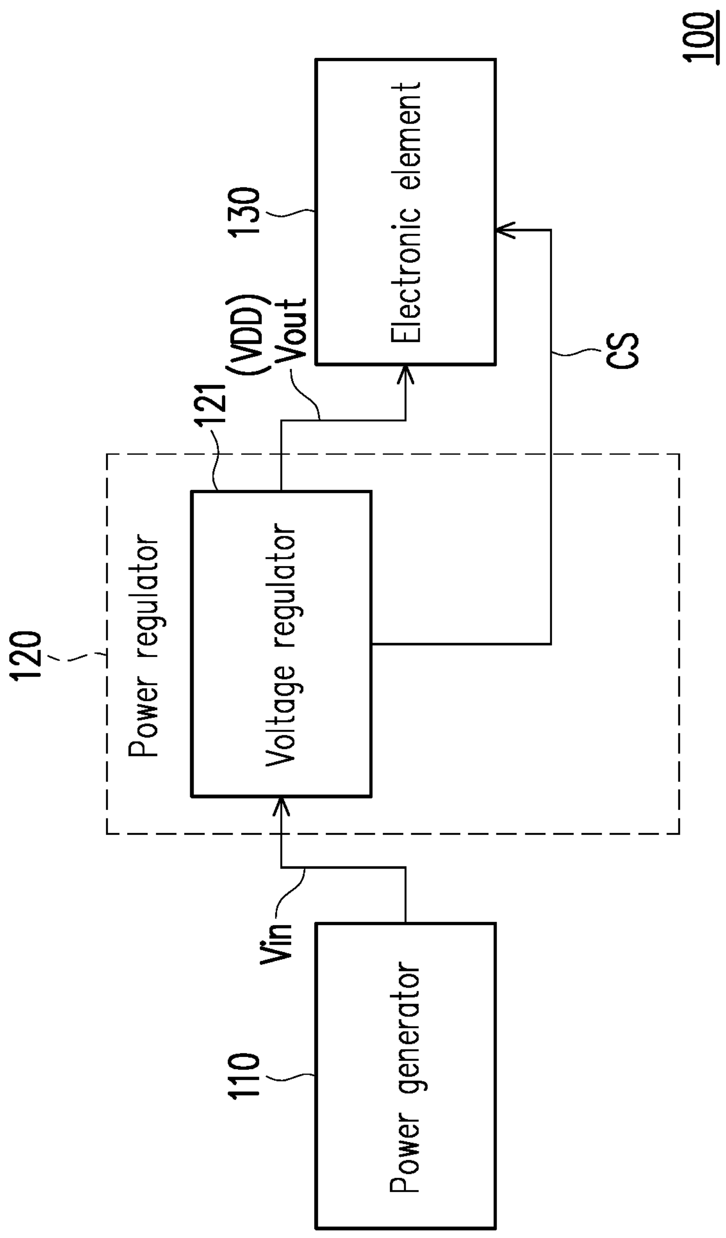
FIG. 1 is a circuit schematic diagram of an electronic device according to an embodiment of the disclosure.

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as “comprise” and “include” are open-ended terms, and should be explained as “including but not limited to . . . ”.

The term “couple (or electrically connect)” used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

The electronic device of the disclosure may include a display device, an antenna device (such as liquid crystal antenna), a sensing device, a lighting device, a touch device, a curved device, a free shape device, a bendable device, flexible device, tiled device or a combination thereof, but is not limited thereto. The electronic device may include light-emitting diode (LED), liquid crystal, fluorescence, phosphor, other suitable materials or a combination thereof, but is not limited thereto. The light emitting diode may include organic light emitting diode (OLED), inorganic light emitting diode such as mini LED, micro LED or quantum dot (QD) light emitting diode (QLED or QDLED), other suitable type of LED or any combination of the above, but is not limited thereto.

FIG. 1 is a circuit schematic diagram of an electronic device according to an embodiment of the disclosure. Referring to FIG. 1, the electronic device 100 includes a power generator 110, a power regulator 120 and an electronic element 130. The power regulator 120 includes a voltage regulator 121. The voltage regulator 121 is electrically connected to the power generator 110 and the electronic element 130. In the embodiment of the disclosure, the power generator 110 may provide an input voltage Vin to the power regulator 120. The voltage regulator 121 may receive the input voltage Vin to generate an output voltage Vout. The electronic element 130 may be electrically connected to the voltage regulator 121 and configured to receive the output voltage Vout. In the embodiment of the disclosure, the output voltage Vout may be used as a power supply source for the electronic element 130 (e.g. an operation voltage VDD of the electronic element 130). In the embodiment of the disclosure, the power generator 110 may be an energy harvesting source, and the energy harvesting source may harvest energy such as sunlight, vibration, thermal energy, radio frequency (RF), etc. The power generator 110 may convert the harvesting energy into the input voltage Vin, where the input voltage Vin varies with the harvesting energy. For example, the input voltage Vin may vary according to the environmental variation or energy variation of the power generator 110. In some embodiments, the power generator 110 is a solar cell, and the input voltage Vin may vary according to environmental variation, for example, sunlight brightness variation.

In the embodiment of the disclosure, the voltage regulator 121 of the power regulator 120 may further generate a control signal CS according to the input voltage Vin, and may provide the control signal CS to the electronic element 130. In the embodiment of the disclosure, the electronic element 130 may be an adjustable device, and an adjustable level of the electronic element 130 may be adjusted according to the control signal CS. Therefore, by means of the power regulator 120, the varied power (the input voltage Vin) from the power generator 110 can be converted into the constant voltage, the power regulator 120 may provide the constant voltage (the output voltage Vout) to the electronic element 130. In addition, the electronic element 130 can be controlled to respond to the environmental variation according to the varied power from the power generator 110 without using any environmental sensors. For example, the adjustable level of the electronic element 130 can be adjusted according to the control signal CS generated from the power regulator 120.

Figure 2:
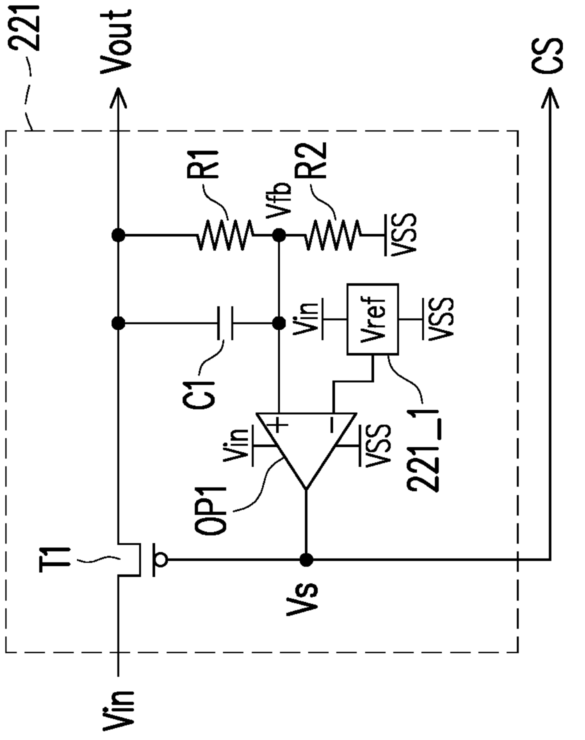
FIG. 2 is a circuit schematic diagram of a voltage regulator according to an embodiment of the disclosure.

FIG. 2 is a circuit schematic diagram of a voltage regulator according to an embodiment of the disclosure. Referring to FIG. 2, the voltage regulator 121 of the embodiment of FIG. 1 may be implemented as a voltage regulator 221 of FIG. 2. In the embodiment of the disclosure, the voltage regulator 221 includes a transistor T1, an operational amplifier (OP) OP1, a resistor R1, a resistor R2, a capacitor C1 and a voltage generator 221_1. A first terminal of the transistor T1 is electrically connected to the power generator (e.g. the power generator 110 of FIG. 1) to receive the input voltage Vin. A second terminal of the transistor T1 is electrically connected to the electronic element (e.g. the electronic element 130 of FIG. 1) to output the output voltage Vout. A control terminal of the transistor T1 is electrically connected to an output terminal of the operational amplifier OP1. The resistor R1 is electrically connected between the second terminal of the transistor T1 and a first input terminal of the operational amplifier OP1. The resistor R2 is electrically connected between the first input terminal of the operational amplifier OP1 and an operation voltage VSS, for example, a common source voltage of the electronic device). In some embodiments, the operation voltage VSS may be a ground voltage. The capacitor C1 is electrically connected between the second terminal of the transistor T1 and the first input terminal of the operational amplifier OP1. Thus, the output voltage Vout is divided across two series resistors to provide a feedback voltage Vfb (divided voltage) to the first input terminal of the operational amplifier OP1. A second input terminal of the operational amplifier OP1 is electrically connected to the voltage generator 221_1 to receive a reference voltage Vref. The voltage generator 221_1 is electrically connected between the input voltage Vin and the operation voltage VSS, and may generate the reference voltage Vref as a constant voltage, regardless of the change of the input voltage Vin. The operational amplifier OP1 may generate a sense voltage Vs to the transistor T1 according to the output voltage Vout and the reference voltage Vref. Specifically, the operational amplifier OP1 may generate a sense voltage Vs according to the feedback voltage Vfb and the reference voltage Vref to control the transistor T1.

In the embodiment of the disclosure, the transistor T1 may be a p-type transistor (e.g. p-type Metal-Oxide-Semiconductor (PMOS) transistor). The first terminal and the second terminal of the transistor T1 may be a source terminal and a drain terminal, and the control terminal of the transistor T1 may be a gate terminal.

Specifically, in the embodiment of the disclosure, when a load resistance of electronic element is changed to affect the output voltage Vout (e.g. the operation voltage VDD of the electronic element 130 of FIG. 1 is changed), the feedback voltage Vfb is correspondingly changed. If the load resistance of electronic element increases, the feedback voltage Vfb increases, and the sense voltage Vs also increases. Thus, the on-resistance of the transistor T1 increases synchronously, so the current flowing through the transistor T1 decreases to cause the output voltage Vout may be pull down by feedback loop to restore the constant voltage. Conversely, if the load resistance of electronic element decreases, the feedback voltage Vfb decreases, and the sense voltage Vs also decreases. Thus, the on-resistance of the transistor T1 decreases synchronously, so the current flowing through the transistor T1 increases to cause the output voltage Vout may be pull up by feedback loop to restore the constant voltage.

In one embodiment of the disclosure, when the input voltage Vin is changed to affect the on-resistance of the transistor T1, the output voltage Vout is correspondingly changed. If the input voltage Vin increases, the on-resistance of the transistor T1 decreases, and output voltage Vout also increases. Thus, the feedback voltage Vfb and the sense voltage Vs increases synchronously to control the transistor T1 to decrease the current flowing through the transistor T1, so the on-resistance of the transistor T1 increases synchronously to pull down the output voltage Vout by feedback loop to restore the constant voltage. If the input voltage Vin decreases, the on-resistance of the transistor T1 increases, and output voltage Vout also decreases. Thus, the feedback voltage Vfb and the sense voltage Vs decreases synchronously to control the transistor T1 to increase the current flowing through the transistor T1, so the on-resistance of the transistor T1 decreases synchronously to pull up the output voltage Vout by feedback loop to restore the constant voltage.

Therefore, the voltage regulator 221 may provide the output voltage Vout having constant voltage level to the electronic element. Moreover, the power regulator 120 having the voltage regulator 221 may further directly provide the sense voltage Vs as the control signal CS to the electronic element, so as to control the electronic element to reflect the environmental variation.

Figure 3:
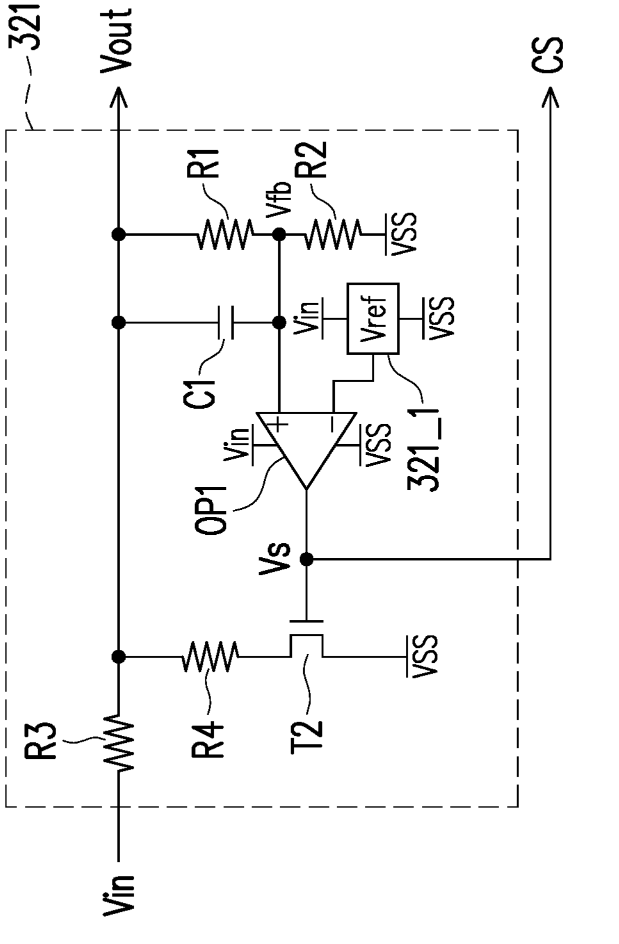
FIG. 3 is a circuit schematic diagram of a voltage regulator according to another embodiment of the disclosure.

FIG. 3 is a circuit schematic diagram of a voltage regulator according to another embodiment of the disclosure. Referring to FIG. 3, the voltage regulator 121 of the embodiment of FIG. 1 may be implemented as a voltage regulator 321 of FIG. 3. In the embodiment of the disclosure, the voltage regulator 321 includes a transistor T2, an operational amplifier OP1, a resistor R1, a resistor R2, a resistor R3, a resistor R4, a capacitor C1 and a voltage generator 321_1. A first terminal of the resistor R3 is electrically connected to the power generator (e.g. the power generator 110 of FIG. 1) to receive the input voltage Vin. A second terminal of the resistor R3 is electrically connected to the electronic element (e.g. the electronic element 130 of FIG. 1) to output the output voltage Vout. A first terminal of the resistor R4 is electrically connected to the second terminal of the resistor R3. A second terminal of the resistor R4 is electrically connected to a first terminal of the transistor T2. The first terminal of the transistor T2 is electrically connected to the second terminal of the resistor R4. A second terminal of the transistor T2 is electrically connected to an operation voltage VSS. A control terminal of the transistor T2 is electrically connected to an output terminal of the operational amplifier OP1. The resistor R1 is electrically connected between the second terminal of the resistor R3 and a first input terminal of the operational amplifier OP1. The resistor R2 is electrically connected between the first input terminal of the operational amplifier OP1 and the operation voltage VSS. The capacitor C1 is electrically connected between the second terminal of the resistor R3 and the first input terminal of the operational amplifier OP1. Thus, the output voltage Vout is divided across two series resistors to provide a feedback voltage Vfb (divided voltage) to the first input terminal of the operational amplifier OP1. A second input terminal of the operational amplifier OP1 is electrically connected to the voltage generator 321_1 to receive a reference voltage Vref. The voltage generator 321_1 is electrically connected between the input voltage Vin and the operation voltage VSS, and may generate the reference voltage Vref as a constant voltage, regardless of the change of the input voltage Vin. The operational amplifier OP1 may generate a sense voltage Vs according to the feedback voltage Vfb and the reference voltage Vref to control the transistor T2.

In the embodiment of the disclosure, the transistor T2 may be an n-type transistor (e.g. n-type Metal-Oxide-Semiconductor (NMOS) transistor). The first terminal and the second terminal of the transistor T2 may be a drain terminal and a source terminal, and the control terminal of the transistor T2 may be a gate terminal.

Specifically, in the embodiment of the disclosure, when a load resistance of electronic element is changed to affect the output voltage Vout (e.g. the operation voltage VDD of the electronic element 130 of FIG. 1 is changed), the feedback voltage Vfb is correspondingly changed. If the load resistance of electronic element increases, the feedback voltage Vfb increases, and the sense voltage Vs also increases. Thus, the on-resistance of the transistor T2 decreases synchronously, so the current flowing through the transistor T2 increases to cause the output voltage Vout may be pull down by feedback loop to restore the constant voltage. Conversely, if the load resistance of electronic element decreases, the feedback voltage Vfb decreases, and the sense voltage Vs also decreases. Thus, the on-resistance of the transistor T2 increases synchronously, so the current flowing through the transistor T2 decreases to cause the output voltage Vout may be pull up by feedback loop to restore the constant voltage.

In one embodiment of the disclosure, when the input voltage Vin is changed, the output voltage Vout is correspondingly changed. If the input voltage Vin increases, the output voltage Vout also increases. Thus, the feedback voltage Vfb and the sense voltage Vs increase synchronously to control the transistor T2, so the current flowing through the transistor T2 increases synchronously to pull down the output voltage Vout by feedback loop to restore the constant voltage. If the input voltage Vin decreases, the output voltage Vout also decreases. Thus, the feedback voltage Vfb and the sense voltage Vs decrease synchronously to control the transistor T2 to increase the on-resistance of the transistor T2, so the current flowing through the transistor T2 decreases synchronously to pull up the output voltage Vout by feedback loop to restore the constant voltage.

Therefore, the voltage regulator 321 may provide the output voltage Vout having constant voltage level to the electronic element. Moreover, the power regulator having the voltage regulator 321 may further directly provide the sense voltage Vs as the control signal CS to the electronic element, so as to control the electronic element to reflect the environmental variation.

Figure 4:
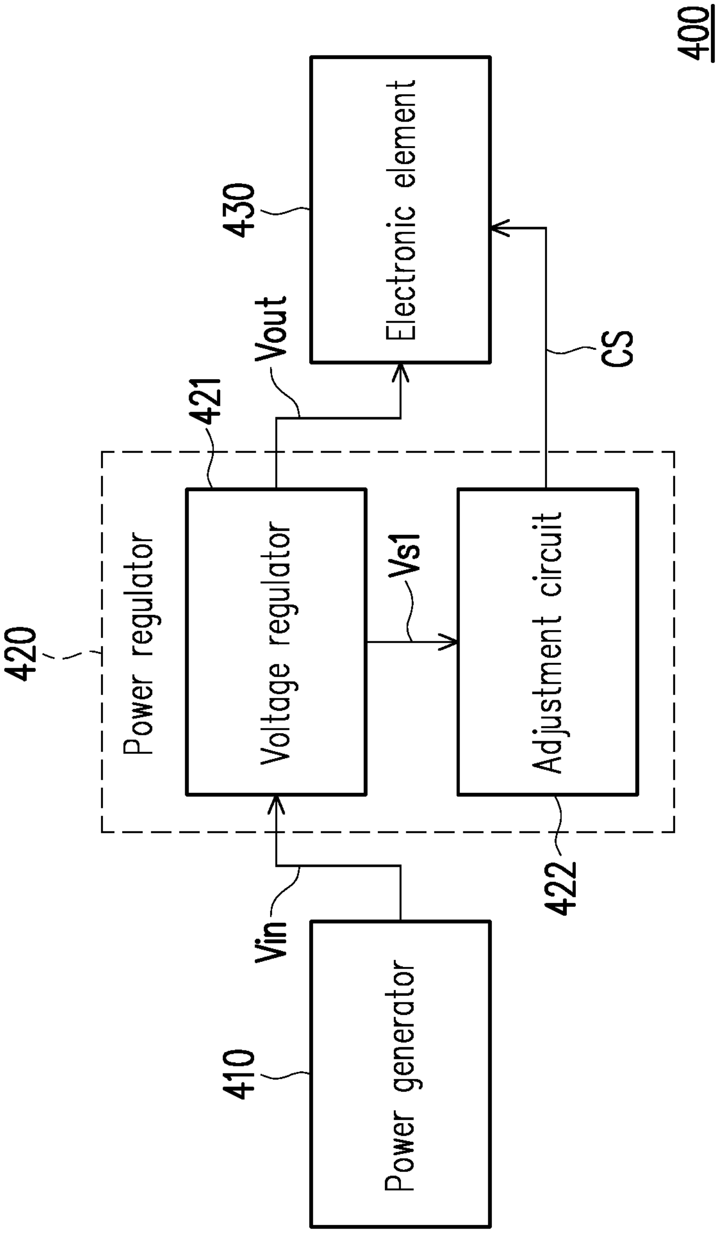
FIG. 4 is a circuit schematic diagram of an electronic device according to another embodiment of the disclosure.

FIG. 4 is a circuit schematic diagram of an electronic device according to another embodiment of the disclosure. Referring to FIG. 4, the electronic device 400 includes a power generator 410, a power regulator 420 and an electronic element 430. The power regulator 420 includes a voltage regulator 421 and an adjustment circuit 422. The voltage regulator 421 is electrically connected to the power generator 410, the electronic element 430 and the adjustment circuit 422. The adjustment circuit 422 is electrically connected to the voltage regulator 421 and the electronic element 430. In the embodiment of the disclosure, the power generator 410 may provide an input voltage Vin to the power regulator 420. The voltage regulator 421 may receive the input voltage Vin to generate an output voltage Vout. The electronic element 430 may receive the output voltage Vout. In the embodiment of the disclosure, the output voltage Vout may be used as a power supply source for the electronic element 430 (e.g. an operation voltage VDD of the electronic element 430). In the embodiment of the disclosure, the power generator 410 may be an energy harvesting source, which may be, for example, harvesting sunlight, vibration, thermal energy, radio frequency (RF), and so on. The power generator 410 may convert the harvesting energy into the input voltage Vin, where the input voltage Vin varies with the harvesting energy. For example, the input voltage Vin may vary according to the environmental variation. In some embodiments, the power generator 410 is a solar cell, and the input voltage Vin may vary according to environmental variation, for example, sunlight variation.

In the embodiment of the disclosure, the voltage regulator 421 of the power regulator 420 may further generate a sense voltage Vs1 according to the input voltage Vin to the adjustment circuit 422. The adjustment circuit 422 may receive the sense voltage Vs1. The adjustment circuit 422 may provide the control signal CS to the electronic element 430 according to the sense voltage Vs1. In the embodiment of the disclosure, the electronic element 430 may be an adjustable device, and an adjustable level of the electronic element 430 may be adjusted according to the control signal CS. Therefore, by means of the power regulator 420, the varied power (the input voltage Vin) from the power generator 410 can be converted into the constant voltage, the power regulator 420 may provide the constant voltage (the output voltage Vout) to the electronic element 430. In addition, the electronic element 430 can be controlled to respond to the environmental variation according to the varied power from the power generator 410 without using any environmental sensors. For example, the adjustable level of the electronic element 430 can be adjusted according to the control signal generated from the power regulator 420.

Figure 5:
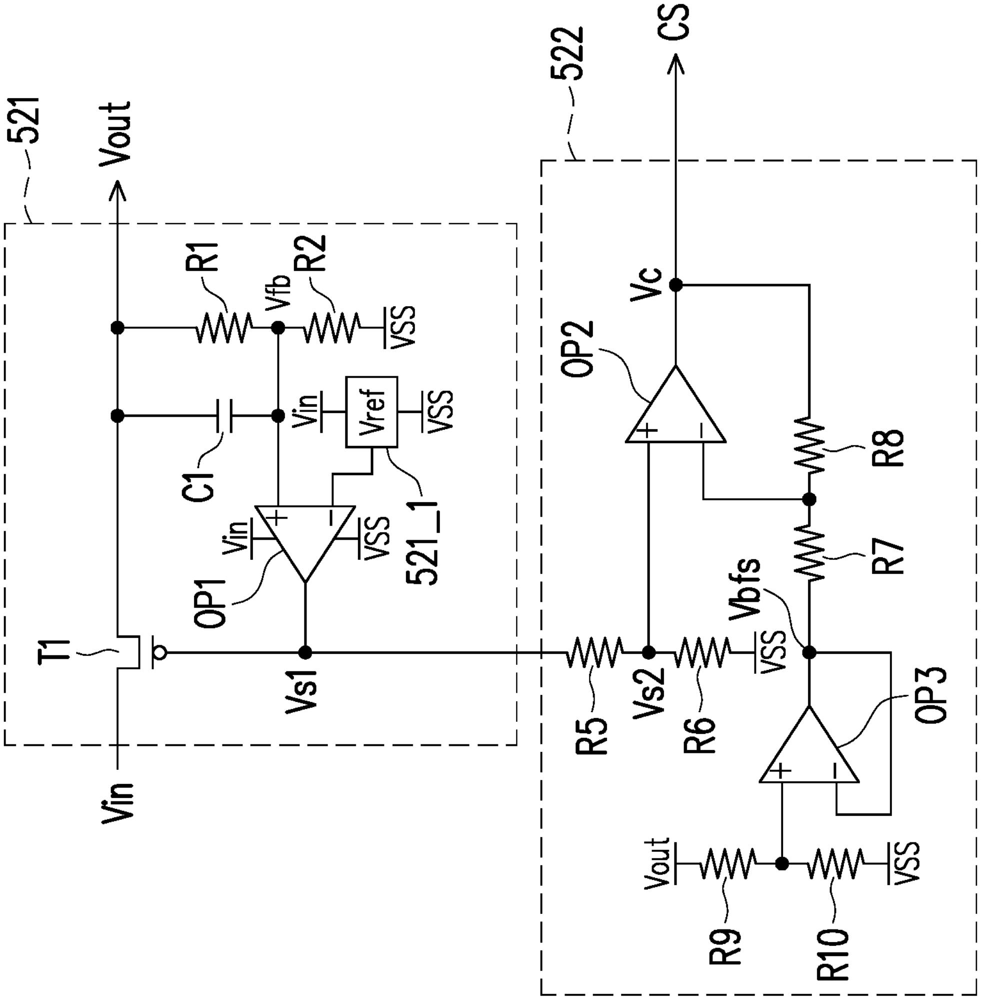
FIG. 5 is a circuit schematic diagram of a power regulator according to an embodiment of the disclosure.

FIG. 5 is a circuit schematic diagram of a power regulator according to an embodiment of the disclosure. Referring to FIG. 5, the power regulator includes a voltage regulator 521 and an adjustment circuit 522. The voltage regulator 421 and the adjustment circuit 422 of the embodiment of FIG. 4 may be implemented as the voltage regulator 521 and the adjustment circuit 522 of FIG. 5. In the embodiment of the disclosure, the voltage regulator 521 includes a transistor T1, an operational amplifier OP1, a resistor R1, a resistor R2, a capacitor C1 and a voltage generator 521_1. In the embodiment of the disclosure, the transistor T1 may be a p-type transistor. A first terminal and a second terminal of the transistor T1 may be a source terminal and a drain terminal, and a control terminal of the transistor T1 may be a gate terminal. It should be noted that, the manners of electrical connection of the inner circuit unit of the voltage regulator 521 can refer the voltage regulator 221 in the embodiment of FIG. 2, and the details are not repeated here.

In the embodiment of the disclosure, referring to FIG. 5, the adjustment circuit 522 includes an operation amplifier OP2, an operation amplifier OP3 and a resistors R5 to R10. The resistor R5 is electrically connected between the output terminal of the operational amplifier OP1 and a first input terminal of the operational amplifier OP2. The resistor R6 is electrically connected between the first input terminal of the operational amplifier OP2 and an operation voltage VSS, for example, a common source voltage of the electronic device. In some embodiments, the operation voltage VSS may be a ground voltage. Thus, the sense voltage Vs1 is divided across two series resistors to provide another sense voltage Vs2 (divided voltage) to the first input terminal of the operational amplifier OP2. The resistor R7 is electrically connected between an output terminal of the operational amplifier OP3 and a second input terminal of the operational amplifier OP2. The resistor R8 is electrically connected between the second input terminal of the operational amplifier OP2 and an output terminal of the operational amplifier OP2. The resistor R9 is electrically connected between the output voltage Vout and a first input terminal of the operational amplifier OP3. The resistor R10 is electrically connected between the first input terminal of the operational amplifier OP3 and the operation voltage VSS. Thus, the output terminal of the operational amplifier OP3 may provide a fixed voltage Vbfs to the resistor R7, and the fixed voltage Vbfs divided across two series resistors to provide a divided voltage to the second input terminal of the operational amplifier OP2. The operational amplifier OP2 may generate a control voltage Vc the control signal CS to the electronic element. In other words, the adjustment circuit 522 may adjust a voltage variation scale (increase or decrease) of the sense voltage Vs1 to meet the voltage variation scale requested by the electronic element.

Therefore, the voltage regulator 521 may provide the output voltage Vout having constant voltage level to the electronic element. Moreover, the adjustment circuit 522 may provide the control signal CS to the electronic element, so as to control the electronic element to reflect or respond to the environmental variation.

Figure 6:
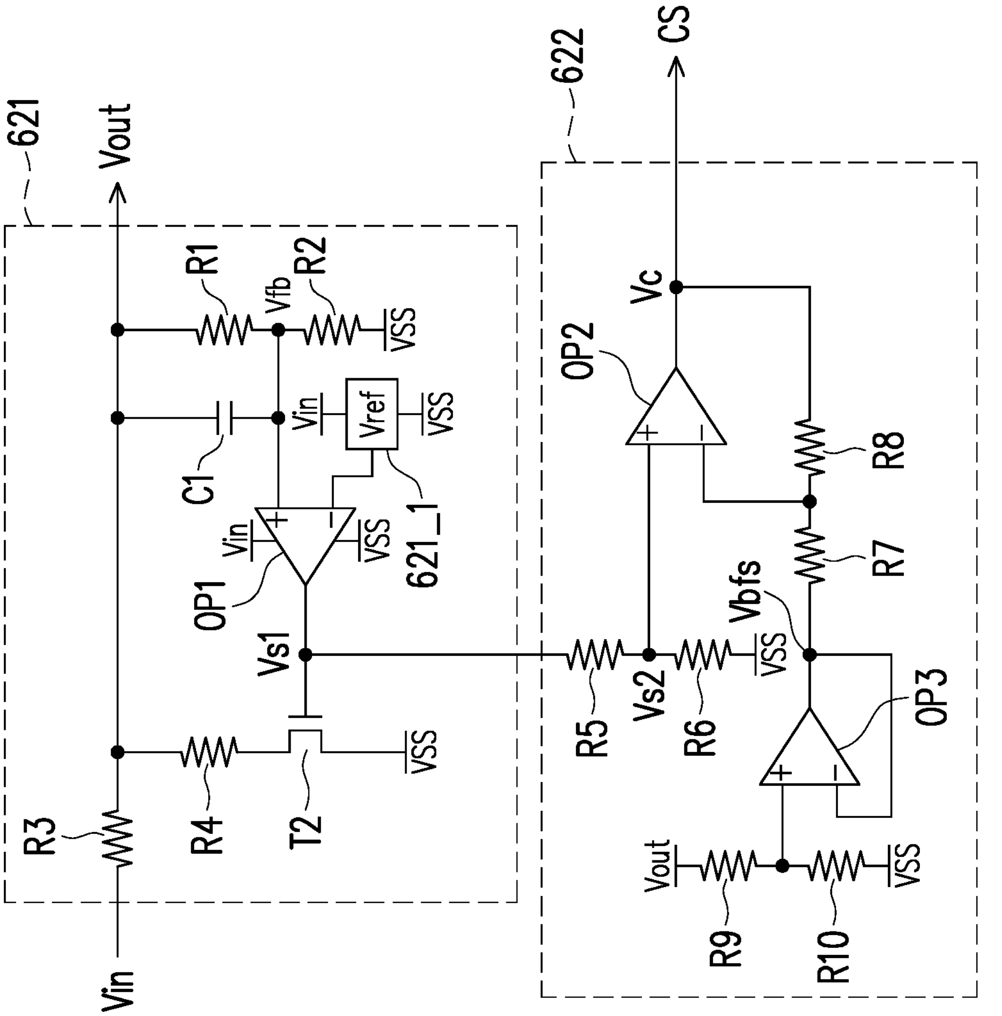
FIG. 6 is a circuit schematic diagram of a power regulator according to another embodiment of the disclosure.

FIG. 6 is a circuit schematic diagram of a power regulator according to another embodiment of the disclosure. Referring to FIG. 6, the voltage regulator 421 and the adjustment circuit 422 of the embodiment of FIG. 4 may be implemented as a voltage regulator 621 and an adjustment circuit 622 of FIG. 6. In the embodiment of the disclosure, the voltage regulator 621 includes a transistor T2, an operational amplifier OP1, a resistor R1, a resistor R2, a resistor R3, a resistor R4, a capacitor C1 and a voltage generator 621_1. In the embodiment of the disclosure, the transistor T2 may be an n-type transistor. A first terminal and a second terminal of the transistor T2 may be a drain terminal and a source terminal, and a control terminal of the transistor T2 may be a gate terminal. It should be noted that, the manners of electrical connection of the inner circuit unit of the voltage regulator 621 can refer the voltage regulator 321 in the embodiment of FIG. 3, and the details are not repeated here.

In the embodiment of the disclosure, referring to FIG. 6, the adjustment circuit 622 includes an operation amplifier OP2, an operation amplifier OP3 and a resistors R5 to R10. It should be noted that, the manners of electrical connection of the inner circuit unit of the adjustment circuit 622 can refer the adjustment circuit 522 in the embodiment of FIG. 5, and the details are not repeated here.

Therefore, the voltage regulator 621 may provide the output voltage Vout having constant voltage level to the electronic element. Moreover, the adjustment circuit 622 may provide the control signal CS to the electronic element, so as to control the electronic element to reflect the environmental variation.

Figure 7:
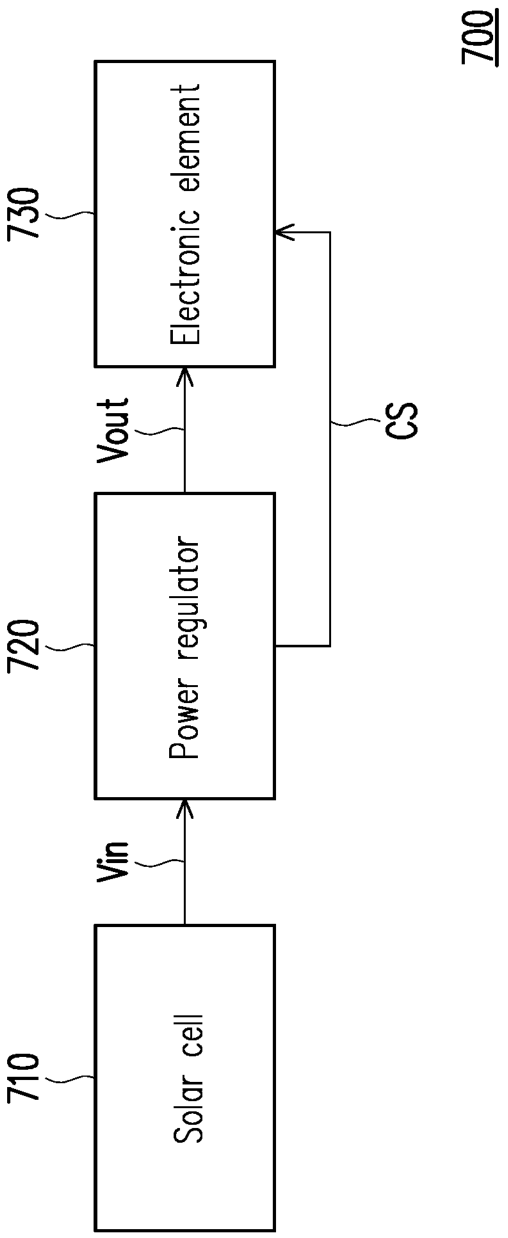
FIG. 7 is a circuit schematic diagram of an electronic device according to a first application embodiment of the disclosure.

FIG. 7 is a circuit schematic diagram of an electronic device according to a first application embodiment of the disclosure. Referring to FIG. 7, the electronic device 700 includes a solar cell 710, a power regulator 720 and an electronic element 730. The electronic element 730 can be responsive to sunlight. In some embodiments, the electronic element 730 can be an electronic element in which the transmittance can be varied according to the brightness or strength of sunlight. For example, the electronic element 730 can be sunglasses or a shading window. The adjustable level can be transmittance of the electronic element 730. The power regulator 720 is electrically connected between the solar cell 710 and the electronic element 730. The solar cell 710 may correspond to the above-mentioned power generator of any one of the embodiments of FIG. 1 to FIG. 6. The power regulator 720 may be implemented as the above-mentioned power regulator of any one of the embodiments of FIG. 1 to FIG. 6. The electronic element 730 may correspond to the above-mentioned electronic element of any one of the embodiments of FIG. 1 to FIG. 6.

In the embodiment of the disclosure, the electronic element 730 can be sunglasses. In some embodiments, the electronic element 730 may include a liquid crystal cell, and a driving circuit to apply a voltage (for example, bias voltage) to the liquid crystal cell. The liquid crystal cell may include a first electrode, a second electrode and a medium layer disposed between the first electrode and the second electrode. The medium layer is a liquid crystal layer. The electronic element 730 may correspond to a plurality of adjustable levels, and the adjustable levels may be different transmittances. The electronic element 730 may change the transmittance of the liquid crystal cell by changing the bias voltage between the first electrode and the second electrode according to the control signal CS.

Specifically, the solar cell 710 may convert the sunlight into the input voltage Vin, where the input voltage Vin varies with the sunlight. By converting the input voltage Vin (the varied sunlight) from the solar cell 710 into the constant voltage, the power regulator 720 may provide the output voltage Vout (the constant voltage) to the electronic element 730. In addition, the power regulator 720 may provide the control signal CS to control the transmittance of the electronic element 730 to respond to the sunlight variation according to the input voltage Vin from the solar cell 710 without using any light sensors.

For example, when the sunlight becomes bright (light source luminance increases), the power regulator 720 may automatically adjust the liquid crystal cell of the electronic element 730 to become dark by reducing the transmittance of the liquid crystal cell. That is, the input voltage Vin increases, the output voltage Vout remains unchanged, and the voltage of the control signal CS increases. When the sunlight becomes dark (light source luminance decreases), the power regulator 720 may automatically adjust the liquid crystal cell of the electronic element 730 to become more transparent by increasing the transmittance of the liquid crystal cell. That is, the input voltage Vin decreases, the output voltage Vout remains unchanged, and the voltage of the control signal CS decreases. In some embodiments, the electronic element 730 can be a shading window. Referring to FIG. 7, the solar cell 710 may be used as a power source by means of the power regulator 720, and the shading degree of the shading window 730 can be automatically controlled in response to the signal reflecting the brightness of the light source, for example, sunlight.

Figure 8:
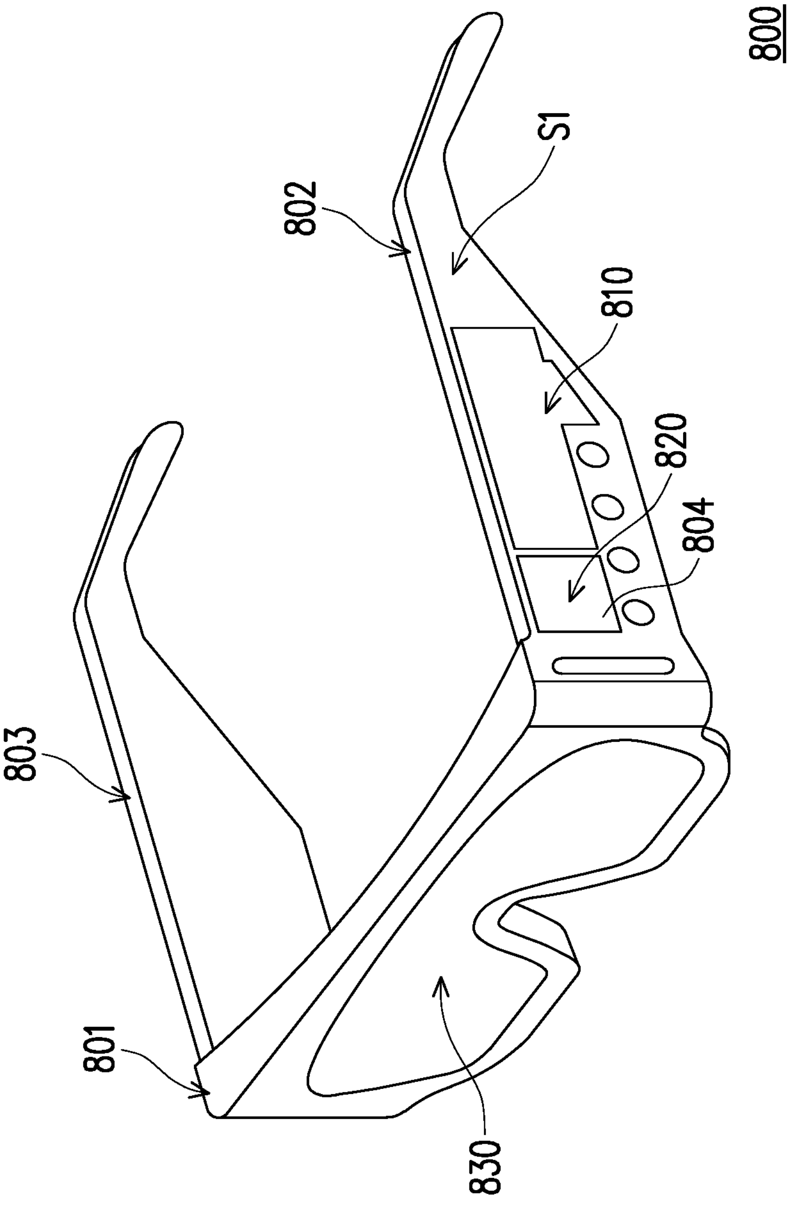
FIG. 8 is a schematic diagram of smart glasses according to the first application embodiment of the disclosure.

FIG. 8 is a schematic diagram of smart glasses according to the first application embodiment of the disclosure. Referring to FIG. 8, the electronic device 700 of FIG. 7 may be implemented as smart glasses 800 of FIG. 8. In the embodiment of the disclosure, the smart glasses 800 include a glasses frame 801 and two glasses tripods 802 and 803. The two glasses tripods 802 and 803 are connected to the glasses frame 801. In addition, the smart glasses 800 include a solar cell 810, a power regulator 820 and sunglasses 830. The sunglasses 830 may be set in the glasses frame 801. The solar cell 810 and the power regulator 820 may be disposed on the glasses tripod 802. In the embodiment of the disclosure, the power regulator 820 can include the voltage regulator 421 and the adjustment circuit 422, as mentioned in FIG. 4. The electronic device 800 can include a substrate 804, and the substrate 804 can be disposed on one side Si of the glasses tripod 802. The voltage regulator and/or the adjustment circuit of the power regulator 820 may be disposed on the substrate 804. In some embodiments, the voltage regulator and the adjustment circuit of the power regulator 820 can be disposed on the same substrate. In some embodiments, the substrate 804 can be a flexible substrate or a rigid substrate. The material of the substrate may include glass, quartz, sapphire, ceramic, polycarbonate (PC), polyimide (PI), polyethylene terephthalate (PET), other suitable substrate materials or a combination thereof, but it is not limited thereto. The voltage regulator and the adjustment circuit disposed on the substrate can include thin film transistors, the thin film transistors can include a semiconductor layer, and the semiconductor layer can be amorphous silicon, low temperature polysilicon, metal oxide, or combinations thereof. In one embodiment of the disclosure, the solar cell 810 may also be disposed on the substrate 804. That is, although not shown in FIG. 8, the voltage regulator and the adjustment circuit of the power regulator 820, and the solar cell 810 can be disposed on the same substrate. The power regulator 820 may provide the power for all operation circuit on the smart glasses 800.

Figure 9:
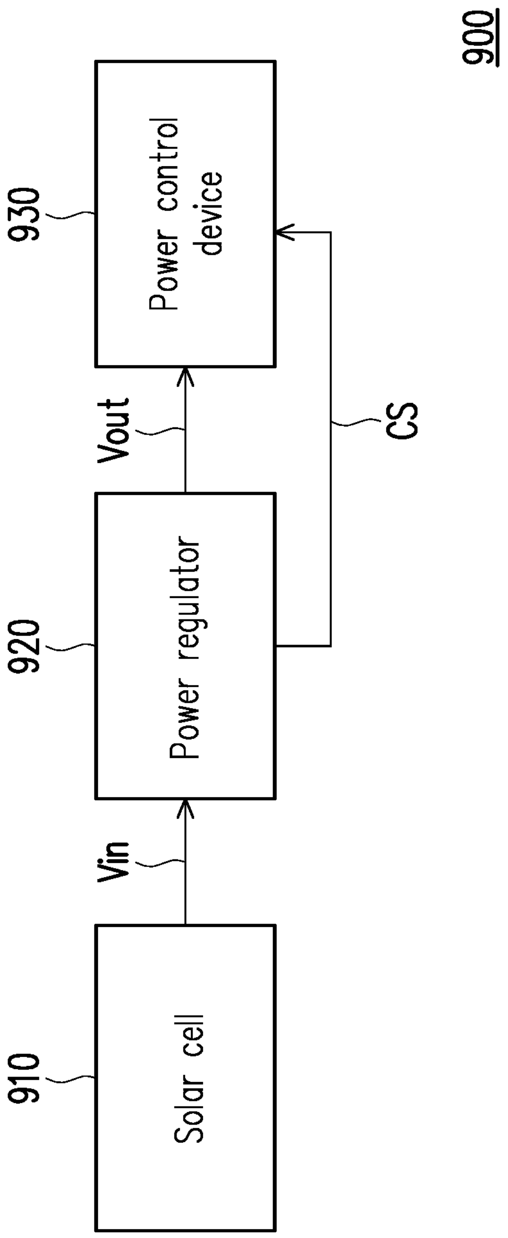
FIG. 9 is a circuit schematic diagram of an electronic device according to a second application embodiment of the disclosure.

FIG. 9 is a circuit schematic diagram of an electronic device according to a second application embodiment of the disclosure. Referring to FIG. 9, the electronic device 900 includes a solar cell 910, a power regulator 920 and a power control device 930. The power control device 930 may correspond to the above-mentioned electronic element of any one of the embodiments of FIG. 1 to FIG. 6. The power regulator 920 is electrically connected between the solar cell 910 and the power control device 930. The solar cell 910 may correspond to the above-mentioned power generator of any one of the embodiments of FIG. 1 to FIG. 6. The power regulator 920 may be implemented as the above-mentioned power regulator of any one of the embodiments of FIG. 1 to FIG. 6.

In the embodiment of the disclosure, referring to FIG. 9, the power control device 930 may control a power consumption of a specific circuit unit in the electronic device 900 to save, for example, the battery capacity automatically. The electronic device 900 may be a solar-powered mobile device, for example, a virtual reality (VR) headset. Specifically, the solar cell 910 may convert the sunlight into the input voltage Vin, where the input voltage Vin varies with the sunlight. The power regulator 920 may provide the output voltage Vout (the constant voltage) to the power control device 930 by converting the input voltage Vin (the varied sunlight) from the solar cell 910, and may provide the control signal CS to control the adjustable level of the power control device 930.

For example, the adjustable level may be a display refresh rate of the power control device 930 of the virtual reality (VR) headset 900. The VR headset 900 can include a display panel (not shown), and the display panel can display image with display refresh rate. If the VR headset operates at a higher display refresh rate, the VR headset may consume more power to achieve the higher display refresh rate. If the VR headset operates at a lower display refresh rate, the VR headset may just require less power to achieve the lower display refresh rate. When the sunlight becomes bright (light source luminance increases), the power regulator 920 may automatically adjust the power control device 930 to operate the display refresh rate of the VR headset in a normal mode. That is, the input voltage Vin increases, the output voltage Vout remains unchanged, and the voltage of the control signal CS increases. When the sunlight becomes dark (light source luminance decreases), the power regulator 920 may automatically adjust the power control device 930 to reduce the display refresh rate of the VR headset for power saving.

That is, the input voltage Vin decreases, the output voltage Vout remains unchanged, and the voltage of the control signal CS decreases. Therefore, the electronic device 900 may be implemented as a solar-power mobile device capable of automatically adjusting the power consumption according to the change of sunlight. In some embodiments, when the sunlight brightness is higher, the power control device 930 can have a higher display refresh rate, and the solar-powered mobile device 900 can be in a normal mode. When the sunlight brightness is lower (for example, in the dark), the power control device 930 can have a lower display refresh rate, thus saving power consumption, and the solar-powered mobile device 900 can be in a power saving mode.

Figure 10:
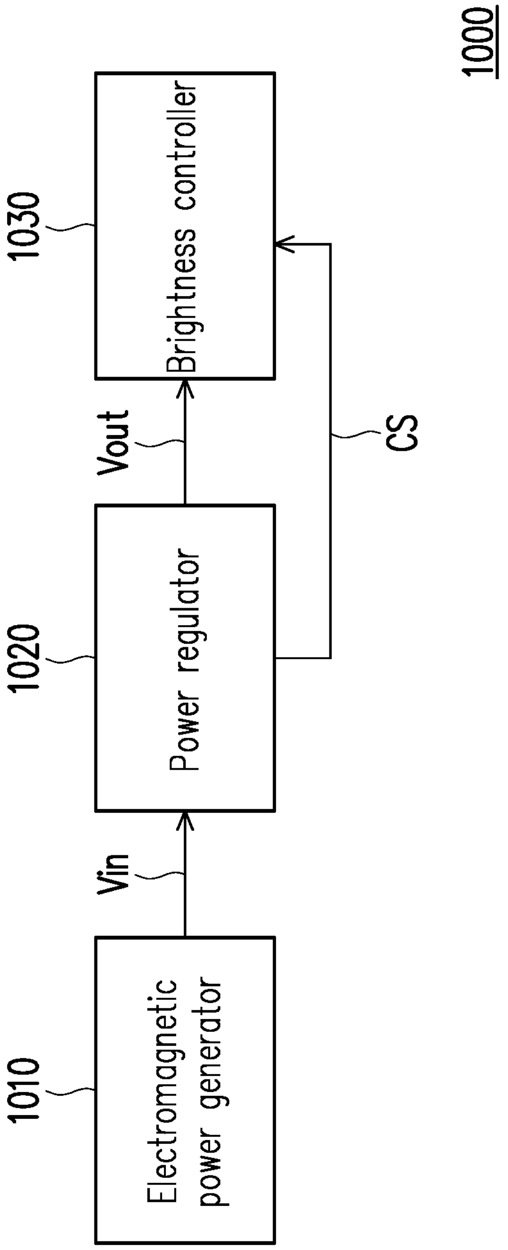
FIG. 10 is a circuit schematic diagram of an electronic device according to a third application embodiment of the disclosure.

FIG. 10 is a circuit schematic diagram of an electronic device according to a third application embodiment of the disclosure. Referring to FIG. 10, the electronic device 1000 includes an electromagnetic power generator 1010, a power regulator 1020 and a brightness controller 1030. The electromagnetic power generator 1010 may correspond to the above-mentioned power generator of any one of the embodiments of FIG. 1 to FIG. 6. The brightness controller 1030 may correspond to the above-mentioned electronic element of any one of the embodiments of FIG. 1 to FIG. 6. The power regulator 1020 is electrically connected between the electromagnetic power generator 1010 and the brightness controller 1030. The power regulator 1020 may be implemented as the above-mentioned power regulator of any one of the embodiments of FIG. 1 to FIG. 6.

In the embodiment of the disclosure, the electronic device 1000 may be a light stick, the electronic device 1000 can include a light source unit (not shown). Referring to FIG. 10, the brightness controller 1030 may control a brightness of the light source unit in the electronic device 1000 automatically. Specifically, the electromagnetic power generator 1010 may convert the shaking vibration into the input voltage Vin by means of electromagnetic conversion, where the input voltage Vin varies with the shaking vibration. The power regulator 1020 may provide the output voltage Vout (the constant voltage) to the brightness controller 1030 by converting the input voltage Vin from the electromagnetic power generator 1010, and may provide the control signal CS to control the adjustable level of the brightness controller 1030.

For example, referring to FIG. 10, the adjustable level can be brightness of the electronic element 1030 of the electronic device 1000. Specifically, the adjustable level may be brightness of the light source unit in the light stick 1000. When the shaking vibration increases, the power regulator 1020 may automatically adjust the brightness controller 1030 to increase the brightness of the light source in the light stick. That is, the input voltage Vin increases, the output voltage Vout remains unchanged, and the voltage of the control signal CS increases. When the shaking vibration decreases, the power regulator 1020 may automatically adjust the brightness controller 1030 to decrease the brightness of the light source in the light stick. That is, the input voltage Vin decreases, the output voltage Vout remains unchanged, and the voltage of the control signal CS decreases. Therefore, the electronic device 1000 may be implemented as the light stick capable of automatically adjusting the brightness according to the change of shaking vibration. In some embodiments, the adjustable level of the light stick can be a brightness, a color, a flashing pattern, or combinations thereof.

Figure 11:
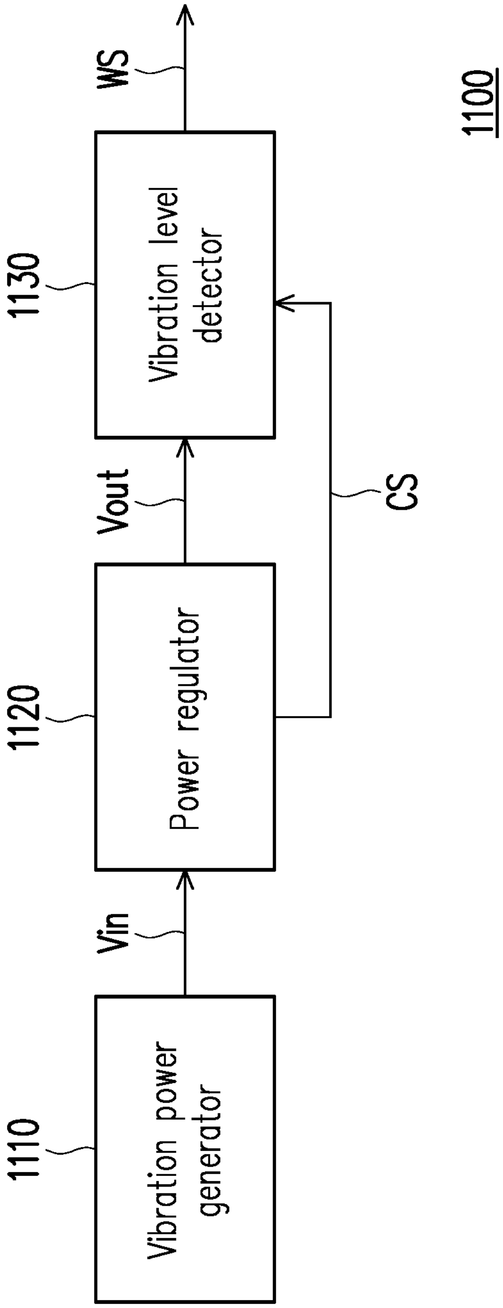
FIG. 11 is a circuit schematic diagram of an electronic device according to a fourth application embodiment of the disclosure.

FIG. 11 is a circuit schematic diagram of an electronic device according to a fourth application embodiment of the disclosure. Referring to FIG. 11, the electronic device 1100 includes a vibration power generator 1110, a power regulator 1120 and a vibration level detector 1130. The power regulator 1120 is electrically connected between the vibration power generator 1110 and the vibration level detector 1130. The vibration power generator 1110 may correspond to the above-mentioned power generator of any one of the embodiments of FIG. 1 to FIG. 6. The power regulator 1120 may be implemented as the above-mentioned power regulator of any one of the embodiments of FIG. 1 to FIG. 6. The vibration level detector 1130 may correspond to the above-mentioned electronic element of any one of the embodiments of FIG. 1 to FIG. 6.

In the embodiment of the disclosure, the electronic device 1100 may be a motor, and the adjustable level can be a vibration monitor level. Referring to FIG. 11, the vibration level detector 1130 may generate a warning signal WS according to the adjustable level automatically. Specifically, the vibration power generator 1110 may convert the vibration of the motor into the input voltage Vin by means of vibration conversion, where the input voltage Vin varies with the vibration of the motor. The power regulator 1120 may provide the output voltage Vout (the constant voltage) to the vibration level detector 1130 by converting the input voltage Vin from the vibration power generator 1110, and may provide the control signal CS to control the adjustable level of the vibration level detector 1130.

For example, the adjustable level may be a vibration monitor level. When the vibration increases, the power regulator 1120 may automatically increase the vibration monitor level. That is, the input voltage Vin increases, the output voltage Vout remains unchanged, and the voltage of the control signal CS may increase. When the vibration decreases, the power regulator 1120 may automatically decrease the vibration monitor level. That is, the input voltage Vin decreases, the output voltage Vout remains unchanged, and the voltage of the control signal CS may decrease. In this case, the voltage polarity of the control signal CS is aligned to the vibration monitor level, so the voltage polarity of the control signal CS may be changed by the adjustment circuit, but the disclosure is not limited thereto. Therefore, when the vibration level detector 1130 detects that the vibration monitor level is higher than a vibration monitor criteria level (for example, a predetermined level), the vibration level detector 1130 may automatically generate the warning signal WS to effectively give notice to the user. According to some embodiments, by means of the power regulator, the adjustable level of the electronic element can be adjusted according to the control signal, and the control signal can be responsive to energy variation of the power generator. For example, in FIG. 11, the control signal CS can be responsive to energy variation of the power generator, for example, vibration variation of the vibration power generator 1110.

Figure 12:
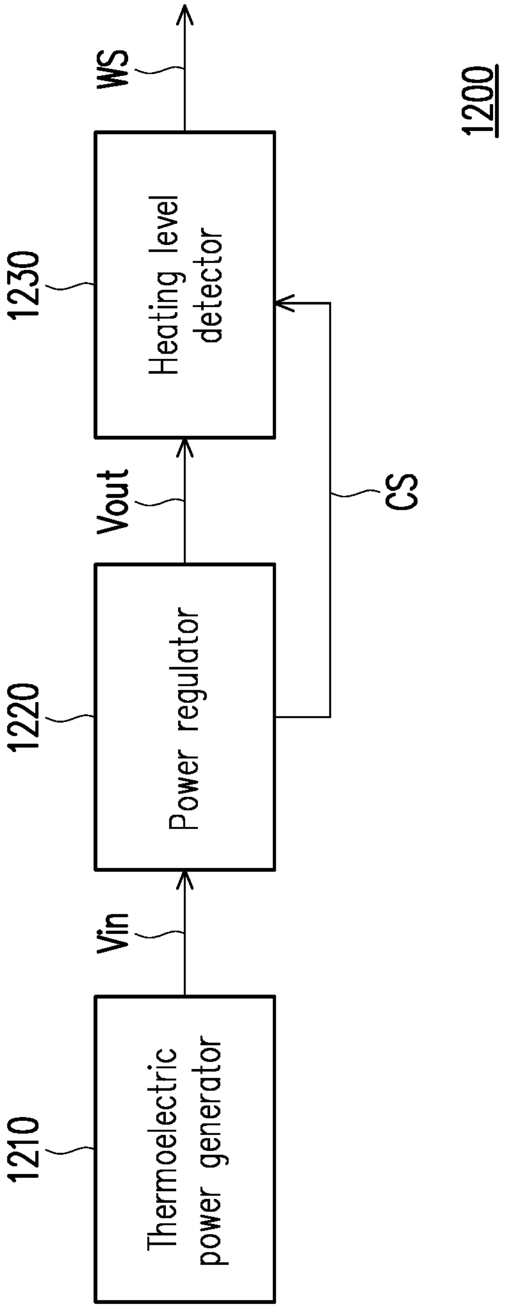
FIG. 12 is a circuit schematic diagram of an electronic device according to a fifth application embodiment of the disclosure.

FIG. 12 is a circuit schematic diagram of an electronic device according to a fifth application embodiment of the disclosure. Referring to FIG. 12, the electronic device 1200 includes a thermoelectric power generator 1210, a power regulator 1220 and a heating level detector 1230. The power regulator 1220 is electrically connected between the thermoelectric power generator 1210 and the heating level detector 1230. The thermoelectric power generator 1210 may correspond to the above-mentioned power generator of any one of the embodiments of FIG. 1 to FIG. 6. The power regulator 1220 may be implemented as the above-mentioned power regulator of any one of the embodiments of FIG. 1 to FIG. 6. The heating level detector 1230 may correspond to the above-mentioned electronic element of any one of the embodiments of FIG. 1 to FIG. 6.

In the embodiment of the disclosure, the electronic device 1200 may be a motor or a cooking pan, and the adjustable level may be a heating monitor level. Referring to FIG. 12, the heating level detector 1230 may generate a warning signal WS according to the adjustable level automatically. Specifically, the thermoelectric power generator 1210 may convert the thermal energy of the motor or the cooking pan into the input voltage Vin, where the input voltage Vin varies with the thermal energy of the motor or the cooking pan. The power regulator 1220 may provide the output voltage Vout (the constant voltage) to the heating level detector 1230 by converting the input voltage Vin from the thermoelectric power generator 1210, and may provide the control signal CS to control the adjustable level of the heating level detector 1230.

For example, the adjustable level may be a heating monitor level. When the temperature of the motor or the cooking pan increases, the power regulator 1220 may automatically increase the heating monitor level. That is, the input voltage Vin increases, the output voltage Vout remains unchanged, and the voltage of the control signal CS may increase. When the temperature of the motor or the cooking pan decreases, the power regulator 1220 may automatically decrease the heating monitor level. That is, the input voltage Vin decrease, the output voltage Vout remains unchanged, and the voltage of the control signal CS may decrease. In this case, the voltage polarity of the control signal CS is aligned to the heating monitor level, so the voltage polarity of the control signal CS may be changed by the adjustment circuit, but the disclosure is not limited thereto. Therefore, when the heating level detector 1230 detects that the heating monitor level is higher than a heating monitor criteria level (for example, a predetermined level), the heating level detector 1230 may automatically generate the warning signal WS to effectively give notice to the user.

Figure 13:
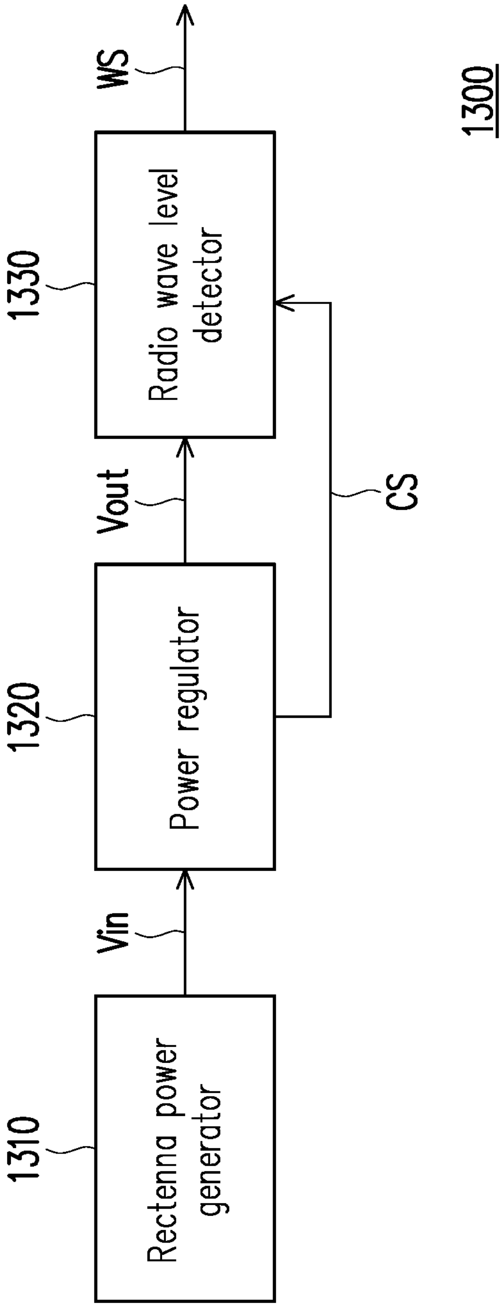
FIG. 13 is a circuit schematic diagram of an electronic device according to a sixth application embodiment of the disclosure.

FIG. 13 is a circuit schematic diagram of an electronic device according to a sixth application embodiment of the disclosure. Referring to FIG. 13, the electronic device 1300 includes a rectenna power generator 1310, a power regulator 1320 and a radio wave level detector 1330. The power regulator 1320 is electrically connected between the rectenna power generator 1310 and the radio wave level detector 1330. The rectenna power generator 1310 may correspond to the above-mentioned power generator of any one of the embodiments of FIG. 1 to FIG. 6. The power regulator 1320 may be implemented as the above-mentioned power regulator of any one of the embodiments of FIG. 1 to FIG. 6. The radio wave level detector 1330 may correspond to the above-mentioned electronic element of any one of the embodiments of FIG. 1 to FIG. 6.

In the embodiment of the disclosure, the electronic device 1300 may be a remote controller, and the adjustable level may be a radio wave monitor level. Referring to FIG. 13, the radio wave level detector 1330 may generate a warning signal WS according to the adjustable level automatically. Specifically, the rectenna power generator 1310 may convert the radio wave into the input voltage Vin, where the input voltage Vin varies with the strength level of the radio wave received by the remote controller. The power regulator 1320 may provide the output voltage Vout (the constant voltage) to the radio wave level detector 1330 by converting the input voltage Vin from the rectenna power generator 1310, and may provide the control signal CS to control the adjustable level of the radio wave level detector 1330.

For example, the adjustable level may be a radio wave monitor level. When the strength of the radio wave increases, the power regulator 1320 may automatically increase the radio wave monitor level. That is, the input voltage Vin increases, the output voltage Vout remains unchanged, and the voltage of the control signal CS may increase. When the strength of the radio wave decreases, the power regulator 1320 may automatically decrease the radio wave monitor level. That is, the input voltage Vin decreases, the output voltage Vout remains unchanged, and the voltage of the control signal CS may decrease. In this case, the voltage polarity of the control signal CS is aligned to the radio wave monitor level, so the voltage polarity of the control signal CS may be changed by the adjustment circuit, but the disclosure is not limited thereto. Therefore, when the radio wave level detector 1330 detects that the radio wave monitor level is lower than a radio wave monitor criteria level (for example, a predetermined level), the radio wave level detector 1330 may automatically generate a warning signal WS to effectively notify the user. Or, when the radio wave level detector 1330 detects that the radio wave monitor level is higher than another radio wave monitor criteria level, the radio wave level detector 1330 may automatically notify the user that the currently connected router device can be used.

In summary, according to some embodiments, the power generator can provide the input voltage to the power regulator, and the power regulator can provide a constant output voltage to the electronic element and generate a control signal to the electronic element. According to some embodiments, by means of the power regulator, the adjustable level of the electronic element can be adjusted according to the control signal, and the control signal can be responsive to environmental variation or energy variation of the power generator. Thus, according to some embodiments, the adjustable level of the electronic element can be automatically adjusted without using any environmental sensors.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a power generator, configured to provide an input voltage;

a power regulator, comprising:

a voltage regulator, wherein the voltage regulator is electrically connected to the power generator, and is configured to receive the input voltage to generate an output voltage, wherein the power regulator is configured to generate a control signal according to the input voltage; and an electronic element, electrically connected to the power regulator and configured to receive the output voltage, wherein the output voltage is used as a power supply source for the electronic element;

wherein the electronic element is configured to receive the control signal, and an adjustable level of the electronic element is adjusted according to the control signal, wherein the voltage regulator comprises:

a transistor, electrically connected between the power generator and the electronic element, wherein a first terminal of the transistor is configured to receive the input voltage;

a first operational amplifier, wherein the output terminal of the first operational amplifier is electrically connected to a control terminal of the transistor, and the first operational amplifier is configured to provide a sense voltage to the transistor according to the output voltage and a reference voltage; and a capacitor, wherein a first terminal of the capacitor is electrically connected to a second terminal of the transistor and the electronic element, and a second terminal of the capacitor is electrically connected to an input terminal of the operational amplifier.

2. The electronic device according to claim 1, wherein the adjustable level is a display refresh rate.

3. The electronic device according to claim 1, wherein the adjustable level is a brightness, a color, a flashing pattern, or combinations thereof.

4. The electronic device according to claim 1, wherein the adjustable level is a vibration monitor level.

5. The electronic device according to claim 1, wherein the voltage regulator further comprises:

a first resistor, electrically connected between the transistor and the operational amplifier; and a second resistor, electrically connected between the operational amplifier and an operation voltage.

6. The electronic device according to claim 1, wherein the adjustable level is a heating monitor level.

7. The electronic device according to claim 1, wherein the power regulator provides the sense voltage as the control signal to the electronic element.

8. The electronic device according to claim 1, wherein the power regulator further comprises:

an adjustment circuit, electrically connected to the voltage regulator and the electronic element, and configured to receive the sense voltage and provide the control signal to the electronic element.

9. The electronic device according to claim 8, further comprising a substrate, wherein the voltage regulator and the adjustment circuit are disposed on the substrate.

10. The electronic device according to claim 8, wherein the adjustment circuit comprises:

a second operational amplifier, electrically connected to the first operational amplifier and the electronic element, and configured to provide the control signal to the electronic element according to the sense voltage.

11. The electronic device according to claim 10, wherein the adjustment circuit comprises:

a third operational amplifier, electrically connected to the second operational amplifier, and configured to provide a fixed voltage to the second operational amplifier, wherein the second operational amplifier provides the control signal to the electronic element according to the sense voltage and the fixed voltage.

12. The electronic device according to claim 1, wherein the adjustable level is a radio wave monitor level.

13. The electronic device according to claim 1, wherein the electronic element is configured to generate a warning signal according to the adjustable level.

14. The electronic device according to claim 1, wherein the power generator is an energy harvesting source.

15. The electronic device according to claim 14, wherein the input voltage provided from the power generator is variable.

16. The electronic device according to claim 15, wherein the power generator is a solar cell, and the input voltage provided from the power generator is variable according to sunlight.

17. The electronic device according to claim 16, wherein the adjustable level of the electronic element is transmittance.

18. The electronic device according to claim 17, wherein when the power generator provides a first input voltage, the electronic element has a first adjustable level, and when the power generator provides a second input voltage, the electronic element has a second adjustable level, and wherein the second input voltage is greater than the first input voltage, and the second adjustable level is less than the first adjustable level.

19. The electronic device according to claim 17, wherein the electronic element comprises a first electrode, a second electrode, and a medium layer disposed between the first electrode and the second electrode.

* * * * *